United States Patent
Stagg

(10) Patent No.: US 11,287,792 B2
(45) Date of Patent: *Mar. 29, 2022

(54) DEVICES, SYSTEMS, AND METHODS RELATED TO CONTROLLING MACHINES USING OPERATOR CONTROL UNITS AND PROGRAMMABLE LOGIC CONTROLLERS

(71) Applicant: Cattron North America, Inc., Warren, OH (US)

(72) Inventor: David Stagg, Flat Rock, NC (US)

(73) Assignee: CATTRON NORTH AMERICA, INC., Warren, OH (US)

(*) Notice: Subject to any disclaimer, the term of this patent is extended or adjusted under 35 U.S.C. 154(b) by 146 days.

This patent is subject to a terminal disclaimer.

(21) Appl. No.: 16/803,251

(22) Filed: Feb. 27, 2020

(65) Prior Publication Data

US 2020/0192320 A1    Jun. 18, 2020

Related U.S. Application Data

(63) Continuation of application No. 15/787,215, filed on Oct. 18, 2017, now Pat. No. 10,591,887.

(51) Int. Cl.
*G05B 19/05* (2006.01)

(52) U.S. Cl.
CPC ............ *G05B 19/054* (2013.01); *G05B 2219/13144* (2013.01); *G05B 2219/15117* (2013.01)

(58) Field of Classification Search
USPC .......................................................... 700/17
See application file for complete search history.

(56) References Cited

U.S. PATENT DOCUMENTS 6,748,291 B2   6/2004  Maeda
7,308,337 B2 * 12/2007  Sparenborg ............. B66C 13/48
                                                      212/273

(Continued)

FOREIGN PATENT DOCUMENTS

CN     105511392 A    4/2016
DE       10233873      2/2004

(Continued)

OTHER PUBLICATIONS

European Office Action dated Mar. 26, 2021 for Europea Application No. 188693097 that claims priority to the same parent application as the instant application; 7 pages.

(Continued)

*Primary Examiner* — Md Azad
(74) *Attorney, Agent, or Firm* — Harness, Dickey & Pierce, P.L.C.; Anthony Fussner

(57) ABSTRACT

According to various aspects, exemplary embodiments are disclosed of devices, systems, and methods related to controlling machines using operator control units and programmable logic controllers (PLCs). In an exemplary embodiment, a machine control system includes a machine, a programmable logic controller coupled to the machine, and an operator control unit. The operator control unit includes a user interface configured to receive one or more commands from an operator for controlling the machine, and a wireless interface configured to transmit a message based on the one or more commands received via the user interface. The programmable logic controller is configured to, in response to receiving the message transmitted by the operator control unit, transmit one or more control signals to the machine to control operation of the machine. The system does not include any machine control unit (MCU) separate (Continued)

from the operator control unit and the programmable logic controller.

25 Claims, 4 Drawing Sheets

(56) References Cited

U.S. PATENT DOCUMENTS

| | | | |
|---|---|---|---|
| 10,591,887 B2 | 3/2020 | Stagg | |
| 2006/0212161 A1* | 9/2006 | Bhat | B29C 49/78 700/197 |
| 2006/0245454 A1 | 11/2006 | Balasubramanian | |
| 2008/0133789 A1 | 6/2008 | McNutt et al. | |
| 2010/0114333 A1 | 5/2010 | Otokozawa | |
| 2011/0077906 A1 | 3/2011 | Ueno et al. | |
| 2013/0211559 A1* | 8/2013 | Lawson | H04L 67/10 700/83 |
| 2014/0136911 A1 | 5/2014 | Kao et al. | |
| 2014/0336792 A1* | 11/2014 | Stamberg | H04L 69/40 700/79 |
| 2016/0019737 A1 | 1/2016 | Stagg | |
| 2016/0229434 A1* | 8/2016 | Brousseau | G01S 19/14 |
| 2017/0031339 A1 | 2/2017 | Corbeil et al. | |
| 2017/0227948 A1 | 8/2017 | Wernicke et al. | |
| 2018/0150061 A1 | 5/2018 | Yang | |
| 2018/0327000 A1* | 11/2018 | Jovenall | B61L 15/0027 |

FOREIGN PATENT DOCUMENTS

| | | |
|---|---|---|
| EP | 2489625 A1 | 8/2012 |
| JP | 2004021497 | 1/2004 |
| JP | 2004021497 A | 1/2004 |
| WO | WO-2015173773 A2 | 11/2015 |

OTHER PUBLICATIONS

International Search Report and Written Opinion for PCT Application No. PCT/US2018/056455 filed Oct. 18, 2018, dated Feb. 1, 2019, 13 pages.

European Office Action dated Mar. 26, 2021 for European Application No. 188693097 that claims priority to the same parent application as the instant application; 7 pages.

European Search Report for EP Application No. 18869309.7 which claims priority to the same parent application as the instant application; dated Dec. 21, 2020; 8 pages.

* cited by examiner

DEVICES, SYSTEMS, AND METHODS RELATED TO CONTROLLING MACHINES USING OPERATOR CONTROL UNITS AND PROGRAMMABLE LOGIC CONTROLLERS

CROSS-REFERENCE TO RELATED APPLICATION

This application is a continuation of allowed U.S. patent application Ser. No. 15/787,215 filed Oct. 18, 2017 (issuing as U.S. Pat. No. 10,591,887 on Mar. 17, 2020; published as US2019/0113902 on Apr. 18, 2019). The entire disclosure of the above application is incorporated herein by reference.

FIELD

The present disclosure generally relates to devices, systems, and methods related to controlling machines using operator control units and programmable logic controllers.

BACKGROUND

This section provides background information related to the present disclosure which is not necessarily prior art.

Operator control units (OCUs) are typically configured to control machines via machine control units (MCUs). The operator control unit provides a human machine interface (HMI) to allow an operator to provide commands for controlling the machine. The operator control unit then sends the commands to the machine control unit, which provides an electrical interface to the machine. Separately, programmable logic controllers (PLCs) are sometimes used to provide control signals to a machine.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings

DETAILED DESCRIPTION

Figure 1:
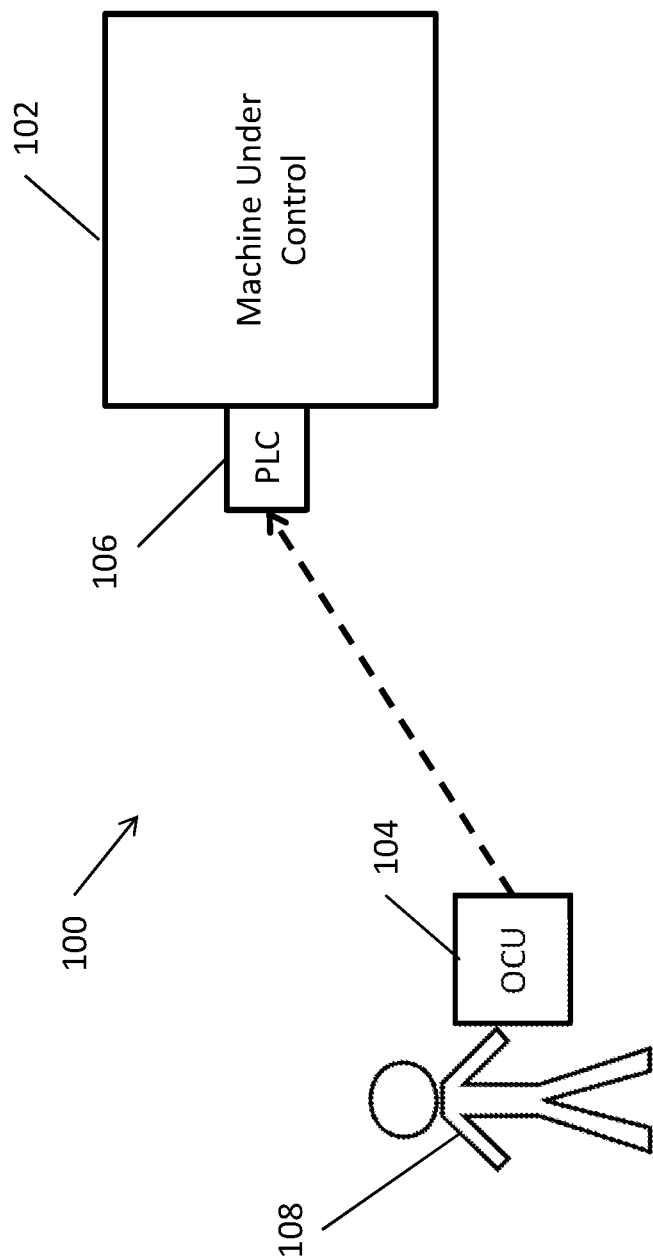
FIG. 1 is a block diagram of an example system for controlling a machine using an operator control unit and a programmable logic controller.

Example embodiments will now be described more fully with reference to the accompanying drawings.

The inventor has recognized that operator control unit systems typically include an operator control unit (OCU) and a machine control unit (MCU). The operator control unit provides a physical human-machine interface (HMI) for an operator, and the machine control unit provides an electrical interface to the machine. Typically, the operator control unit transmits commands to the machine control unit to operate the machine.

The inventor has also recognized that it is possible to remove the machine control unit, thereby simplifying the system design and cost. By having the operator control unit transmit a safe message over a wireless network (e.g., a proprietary wireless network, a secure WiFi radio frequency (RF) channel network, etc.), the message could be received by a programmable logic controller (e.g., a Safety PLC, etc.), instead of a machine control unit.

The programmable logic controller could include an add-on profile (AOP) to decode and interpret commands from the message. The programmable logic controller would then directly control the machine. For example, a crane remote control system may not include any machine control unit before the programmable logic controller.

Disclosed herein are exemplary embodiments of devices, systems, and methods related to controlling a machine using operator control units and programmable logic controllers. In an exemplary embodiment, a machine control system includes a machine adapted to perform one or more operations in response to one or more control signals, a programmable logic controller (PLC) coupled to the machine, and an operator control unit.

The operator control unit includes a user interface configured to receive one or more commands from an operator for controlling the machine, and a wireless interface configured to transmit a message based on the one or more commands received via the user interface. The programmable logic controller is configured to, in response to receiving the message transmitted by the operator control unit, transmit one or more control signals to the machine to control operation of the machine according to the message transmitted by the operator control unit. The system does not include any machine control unit (MCU) separate from the operator control unit and the programmable logic controller.

The operator control unit may be any suitable controller for sending commands to control a machine (e.g., a crane, a hoist, a bridge, a trolley, etc.), including a remote control operable for sending telecommands, etc. The operator control unit may send any suitable commands, including a hoist up command, a hoist down command, a hoist speed command, a bridge forward command, a bridge reverse command, a bridge speed command, a trolley forward command, a trolley reverse command, a trolley speed command, etc. Accordingly, the operator control unit may allow an operator (e.g., a user, a machine control manager, etc.) to control movement and/or other operations of the machine.

The operator control unit may include any suitable user interface for receiving commands and/or other input from an operator, including a touch screen interface, a keypad, one or more buttons, etc. The operator control unit may include a display, one or more lights, light emitting diodes (LEDs), indicators, etc. for displaying information to the operator. The operator control unit may include one or more processors, memory (e.g., one or more hard disks, flash memory, solid state memory, random access memory, read only memory, etc.), configured to operate the OCU and store information related to operation of the OCU.

The operator control unit may include one or more wireless communication interfaces (e.g., wireless radios, antennas, etc.) for wireless communication. For example, the operator control unit may include a WiFi radio interface configured to transmit messages via a secure WiFi radio frequency (RF) channel. Or, for example, the operable control unity may include another RF interface configured to transmit messages via another suitable RF infrastructure, such as LoRa (Long Range), BT (BlueTooth), cellular, etc.

The operator control unit may control the machine via wireless signals transmitted to a programmable logic controller. The programmable logic controller may be any suitable controller for controlling operation of the machine, and may be coupled to one or more systems of the machine including a hoist, a bridge, a trolley system, etc. The programmable logic controller may be mounted on the machine, included inside the machine, attached to the machine, incorporated into the machine, etc.

As stated above, the operator control unit may transmit commands, data, messages, signals, etc. via a wireless network. The wireless network may be any suitable wireless network, including a radio frequency RF channel such as WiFi, a proprietary wireless network, LoRa (Long Range), BT (BlueTooth), cellular, etc. In some embodiments, the operator control unit may transmit (e.g., send, etc.) messages to the programmable logic controller via direct communication from the operator control unit to the programmable logic controller. For example, the operation control unit wireless interface may be a WiFi radio interface, and the programmable logic controller may also include a WiFi radio interface.

In other embodiments, the operator control unit may transmit messages to the programmable logic controller via an intermediate wireless router, an infrastructure network including a hard-wired connection, a backhaul, etc. In some embodiments, multiple operator control units may be connected in a mesh network. The operator control unit may send messages to the programmable logic controller (either directly or indirectly) without using a machine control unit between the OCU and the PLC, such that the machine control system does not include a machine control unit.

Messages including one or more commands may be transmitted from the operator control unit to the programmable logic controller via any suitable protocol, including RF channels, etc. For example, the command data may be transmitted in one or more messages which may be included in one or more RF packets and transmitted on an RF channel.

In some embodiments, the message may be a PLC safe message. In that case, the programmable logic controller can include an add-on profile to decode and interpret the one or more commands from the message. The messages may include multiple data elements such as a source, a target, a cyclic redundancy check (CRC), a timestamp, etc., and the add-on profile may be configured to decode the multiple data elements to interpret the one or more commands.

With reference to the figures, FIG. 1 illustrates an example system 100 according to some aspects of the present disclosure. The system 100 includes a machine 102 coupled to a programmable logic controller 106, which may include any suitable programmable logic controller as described herein.

For example, the programmable logic controller 106 may be connected directly to stepless drives of the machine 102. The programmable logic controller 106 may have a safety integrity level (SIL) of SIL 2, may be a safety PLC having a safety integrity level of SIL 3, etc.

The system 100 also includes an operator control unit 104, which may be any suitable operator control unit as described herein. The operator control unit 104 may receive one or more commands from an operator 108, and transmit the one or more commands to the programmable logic controller 106 (either directly or indirectly as described herein) for controlling the machine 102.

The data received at the programmable logic controller 106 may be a serial stream containing various security elements such as a source, a target, a cyclic redundancy check, a timestamp, data, etc. As described above, the programmable logic controller may include an add-on profile to decode the message, implement the required security protocols, and interpret the data commands. The add-on profile may be any suitable combination of software and/or hardware installed on the programmable logic controller 106.

As one example, the message may be a safe message that is considered a Black Channel, i.e., a deterministic set of data that contains the source, the target, the cyclic redundancy check, the timestamp, and the data. The message may only be valid for one frame even if the data is static, because the following frame would have a different time stamp. In the absence of a new data frame within a specified time, the prior commands may be terminated.

As described above, the commands may include any suitable machine control commands, such as Hoist UP/DOWN/SpeedN, Bridge FWD/REV/SpeedN, Trolley FWD/REV/SpeedN, etc.

As shown in FIG. 1, the operator control unit 104 may allow an operator 108 to control the machine 102, send commands to the programmable logic controller 106, etc., while the operator 108 is remote from the machine 102. Accordingly, the operator 108 may control the machine 102 from a variety of suitable positions. In some embodiments, the operator 108 may be required to be within a threshold distance of the machine 102, such as in sight of the machine 102, within a wireless network signal strength range of the machine 102, etc.

Although FIG. 1 illustrates one machine 102, one operator 108, and one operator control unit 104 in communication with one programmable logic controller 106, in other embodiments the system may include more than one machine 102, more than one operator 108 and operator control unit 104, more than one programmable logic controller 106, etc.

Figure 2:
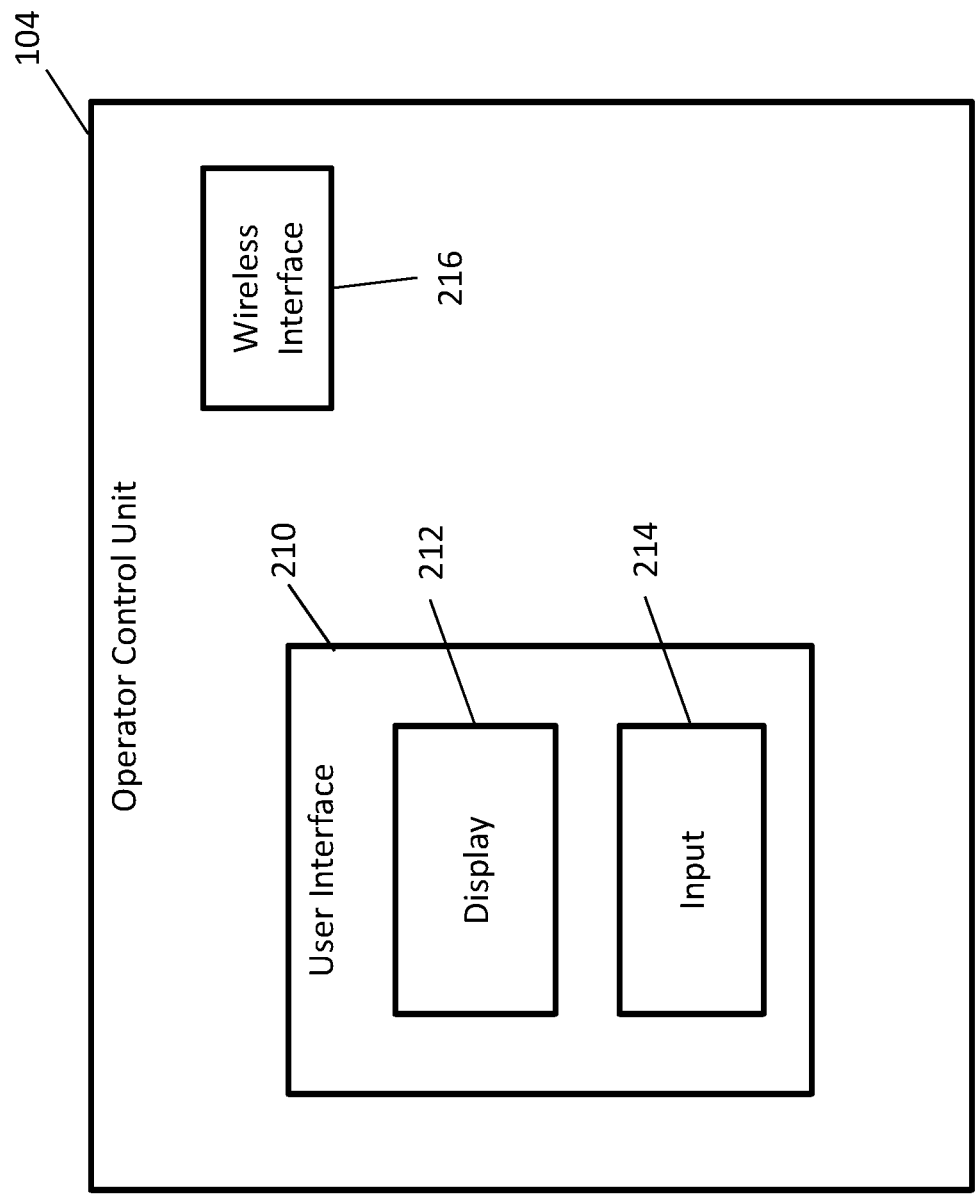
FIG. 2 is a block diagram of the example operator control unit shown in FIG. 1.

FIG. 2 illustrates a block diagram of the operator control unit 104 shown in FIG. 1. The operator control unit 104 includes a user interface 210 for receiving input (e.g., commands, etc.) from an operator. The user interface may include a display 212, which can be any suitable display (e.g., a liquid crystal display (LCD), light emitting diodes (LED), indicator lights, etc.). The user interface may include an input 214, which can include any suitable input element(s) (e.g., a keypad, touchscreen, switches, etc.). In other embodiments, the operator control unit 104 may not include a display 212.

The operator control unit 104 also includes a wireless interface 216. As described above, the wireless interface 216 may communicate with the programmable logic controller 106 (and/or a wireless router, an infrastructure network, etc.), using any suitable wireless communication protocol (e.g., an RF channel such as a secure WiFi connection, a proprietary wireless network, LoRa (Long Range), BT (BlueTooth), cellular, etc.).

Figure 3:
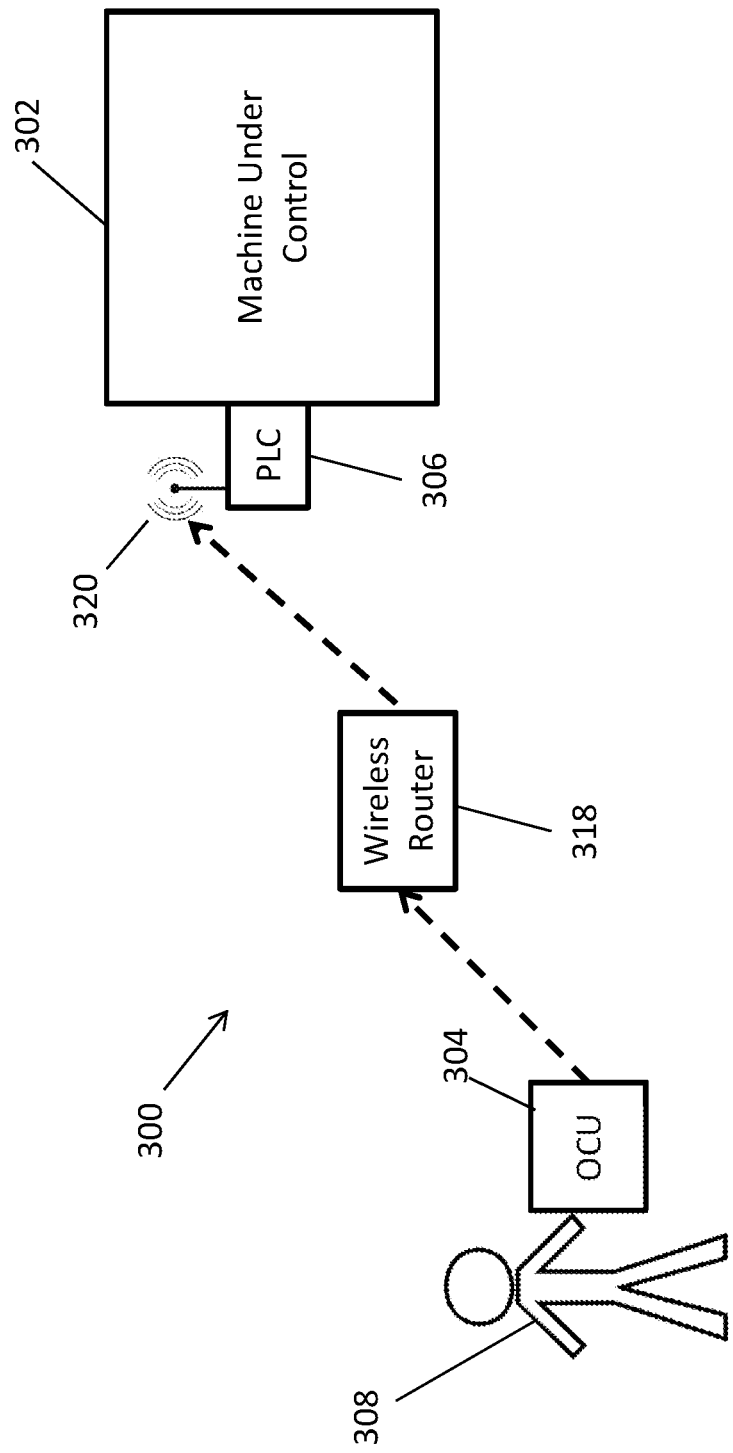
FIG. 3 is a block diagram of another example system including a wireless router between the operator control unit and the programmable logic controller.

FIG. 3 illustrates an example system 300 according to additional aspects of the present disclosure. The system 300 includes a machine 302 coupled to a programmable logic controller 306, which may include any suitable programmable logic controller as described herein.

The system 300 also includes an operator control unit 304, which may be any suitable operator control unit as described herein. The operator control unit 304 may receive one or more commands from an operator 308. Compared to the system 100 illustrated in FIG. 1, the system 300 includes a wireless router 318 coupled between the operator control unit 304 and the programmable logic controller 306.

The wireless router 318 may be any suitable wireless router, such as a WiFi router, etc. The wireless router 318 is configured to receive a message from the operator control unit 304, and transmit the message to a wireless interface 320 of the programmable logic controller 306.

As compared to the direct transmission of messages from the operator control unit 104 to the programmable logic controller 106 in the system 100 of FIG. 1, use of the wireless router 318 between the operator control unit 304 and the programmable logic controller 306 in the system 300 of FIG. 3 may be considered as indirect transmission of messages.

Figure 4:
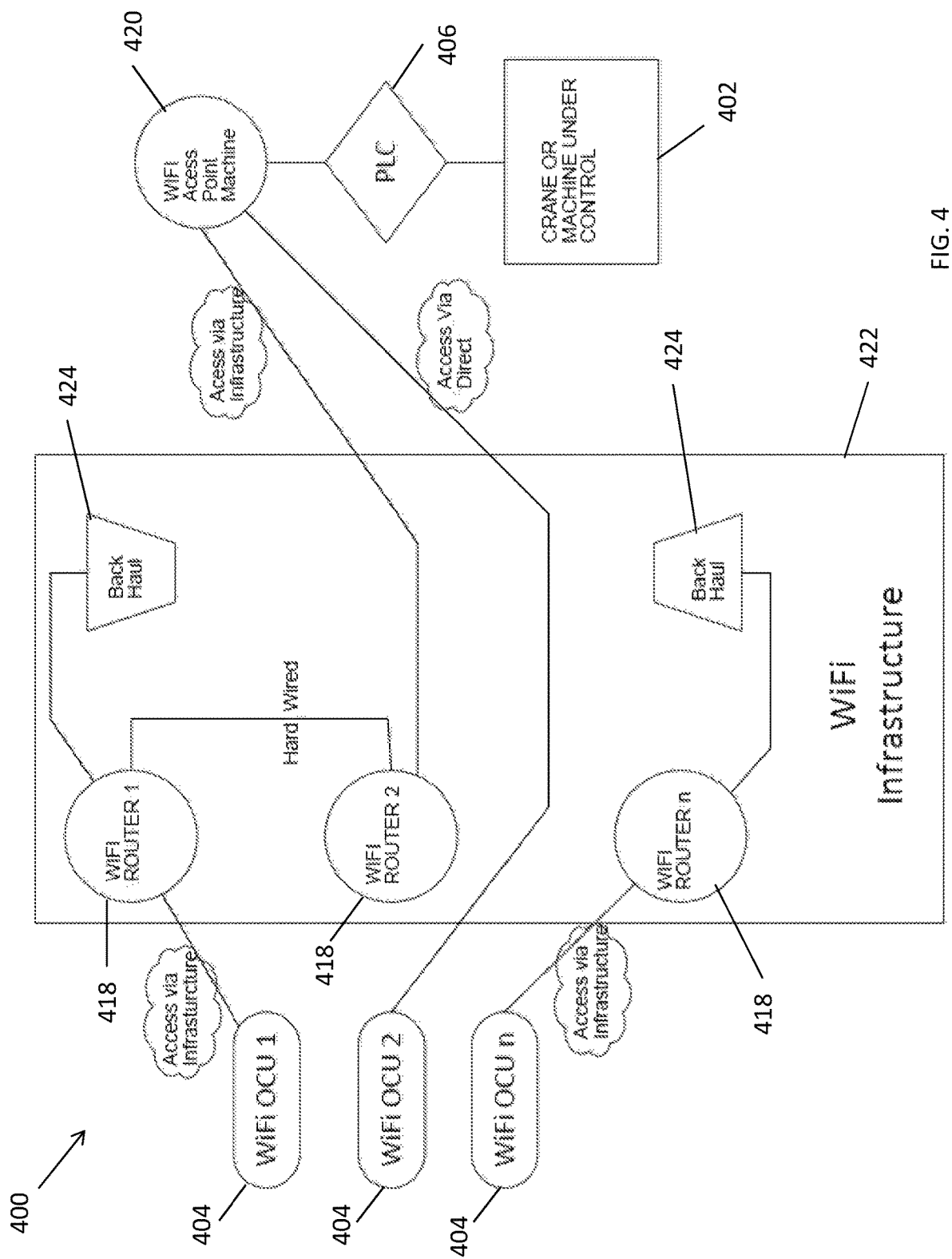
FIG. 4 is a diagram of multiple operator control units in wireless communication with a programmable logic controller via an infrastructure network according to an exemplary embodiment.

FIG. 4 illustrates another example system 400 including multiple operator control units (OCUs) 404, and a programmable logic controller (PLC) 406 coupled to a machine 402. The programmable logic controller 406 has a WiFi interface 420. The system 400 also includes a network infrastructure 422 having multiple WiFi routers 418 and a backhaul 424. Although FIG. 4 shows three WiFi routers 418, other exemplary embodiments of the system 400 may include more or less than three WiFi routers, including no WiFi routers if the system is configured for use with another suitable RF infrastructure for which the PLC has a corresponding RF interface, including LoRa (Long Range), BT (BlueTooth), cellular, etc.

As shown in FIG. 4, each of the operator control units is in communication with the programmable logic controller 406 via a different signal transmission path. For example, WiFi OCU 2 is connected with the WiFi interface 420 of the programmable logic controller 406 via a direct wireless connection.

WiFi OCU 2 is connected with WiFi Router 1, which has a hardwired connection to WiFi Router 2, and WiFi Router 2 is connected with the WiFi interface 420 of the programmable logic controller 406. WiFi OCU n is connected with WiFi Router n, which is connects to WiFi Router 1 via the backhaul 424, and then to the WiFi interface 420 of the programmable logic controller 406 via the hardwired connection to WiFi Router 2.

The operator control units 404 could also be connected with one another in a mesh network. Therefore, it is possible to an operator control unit 404 to connect to the programmable logic controller 406 via a direct connection, via a hardwired connection between wireless routers 418 in the network infrastructure 422, via a backhaul 424 in the network infrastructure 422, via a mesh network with other operator control units 404, etc. Although FIG. 4 shows the system 400 being used with a WiFi infrastructure, the system 400 may be used with any suitable RF infrastructure for which the PLC has a corresponding RF interface (e.g., LoRa (Long Range), BT (BlueTooth), cellular, etc.).

As described herein, the example operator control units and programmable logic controllers may include a microprocessor, microcontroller, integrated circuit, digital signal processor, etc., which may include memory. The operator control units and programmable logic controllers may be configured to perform (e.g., operable to perform, etc.) any of the example processes described herein using any suitable hardware and/or software implementation. For example, the operator control units and programmable logic controllers may execute computer-executable instructions stored in a memory, may include one or more logic gates, control circuitry, etc.

According to another example embodiment, a programmable logic controller includes a wireless interface configured to receive a message transmitted by a wireless interface of an operator control unit. The message includes one or more commands received via a user interface of the operator control unit. The controller also includes a machine interface configured to transmit one or more control signals to a machine to control operation of the machine.

The programmable logic controller also includes and an add-on profile. The add-on profile is configured to decode and interpret the one or more commands in the message transmitted by the operator control unit, and transmit one or more control signals to the machine to control operation of the machine according to the one or more commands, wherein the programmable logic controller does not receive the message transmitted by the operator control unit via any machine control unit separate from the operator control unit and the programmable logic controller.

According to another example embodiment, an exemplary method of controlling a machine in a system including a programmable logic controller and an operator control unit having a user interface and a wireless interface is disclosed. The machine is coupled to programmable logic controller. The exemplary method generally includes receiving via the user interface of the operator control unit, one or more commands from an operator for controlling the machine, and transmitting, by the wireless interface of the operator control unit, a message based on the one or more commands received via the user interface.

The message also includes receiving, at the programmable logic controller, the message transmitted by the operator control unit, and transmitting, by the programmable logic controller, one or more control signals to the machine to control operation of the machine according to the message transmitted by the operator control unit. The system does not include any machine control unit separate from the operator control unit and the programmable logic controller.

In some embodiments, the programmable logic controller may include an add-on profile. In that case, the method may include decoding, by the add-on profile, the message transmitted by the operator control unit to interpret the one or more commands.

The message transmitted by the wireless interface of the operator control unit may be sent directly to the programmable logic controller via a WiFi radio frequency channel. Alternatively, or in addition, the message transmitted by the wireless interface of the operator control unit may be sent to the programmable logic controller via an infrastructure network including at least one of a wireless router, a hard-wired connection, and a backhaul. Also, the message transmitted by the wireless interface of the operator control unit may be sent to the programmable logic controller via another suitable RF infrastructure besides WiFi, such as LoRa (Long Range), BT (BlueTooth), cellular, etc.

Some embodiments may provide one or more (or none) of the following advantages: eliminating a machine control unit (MCU) from the system (e.g., a crane remote control system that does not include any MCU before the PLC), simplifying the system design, reducing the system cost, providing greater flexibility for a machine original equipment manufacturer (OEM), value-added retailer (VAR), and/or systems integrator, etc.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purposes of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A machine control system for a machine adapted to perform one or more operations in response to one or more control signals, the system comprising:
   a programmable logic controller including a wireless interface; and
   an operator control unit including:
      a user interface configured to receive one or more telecommands for allowing an operator to control movement of the machine; and
      a wireless interface configured to transmit a message directly to the wireless interface of the programmable logic controller instead of and without a machine control unit between the operator control unit and the programmable logic controller, the message transmitted according to the one or more telecommands received via the user interface;
   the programmable logic controller configured to, in response to receiving the message transmitted by the operator control unit, transmit one or more control signals to the machine to control movement of the machine according to the message transmitted by the operator control unit, wherein the system does not include any machine control unit separate from or between the operator control unit and the programmable logic controller;
   wherein:
      the message transmitted by the operator control unit includes one or more data elements; and
      the programmable logic controller includes an add-on profile configured to decode the one or more data elements to interpret the one or more telecommands whereby the programmable logic controller is then operable to directly control the machine.

2. The system of claim 1, wherein the one or more data elements comprise multiple data elements including a source, a target, a cyclic redundancy check, and a timestamp.

3. The system of claim 1, wherein the one or more data elements include one or more of: a source, a target, a cyclic redundancy check, or a timestamp.

4. The system of claim 1, wherein the one or more data elements comprise multiple data elements including at least two or more of: a source, a target, a cyclic redundancy check, or a timestamp.

5. The system of claim 1, wherein the one or more data elements comprise multiple data elements including at least one source and at least one target.

6. The system of claim 1, wherein:
the programmable logic controller is positioned at a stationary location of the machine; and
the operator control unit is portable and remote from the machine and the programmable logic controller.

7. The system of claim 1, wherein:
the wireless interface of the programmable logic controller comprises a WiFi radio interface; and
the wireless interface of the operator control unit is configured to transmit a message to the WiFi radio interface of the programmable logic controller via direct communication from the operable control unit to the programmable logic controller according to the one or more telecommands received via the user interface.

8. The system of claim 1, wherein the message transmitted by the operator control unit is a safe message, the one or more telecommands received by the user interface of the operator control unit encoded in the safe message, the safe message including a deterministic set of data comprising security elements, whereby the safe message is valid for a specified time such that in the absence of a new data frame within the specified time, the prior one or more telecommands are terminated.

9. The system of claim 1, wherein the programmable logic controller is connected directly to one or more stepless drives of the machine, and wherein the add-on profile is configured to interpret at least one of a hoist up command, a hoist down command, a hoist speed command, a bridge forward command, a bridge reverse command, a bridge speed command, a trolley forward command, a trolley reverse command, and a trolley speed command.

10. The system of claim 1, wherein:
the wireless interface of the operator control unit is configured to transmit the message via a radio frequency channel; or
the system further comprises a wireless router, the wireless router configured to:
receive the message transmitted by the operator control unit; and
transmit the message to the programmable logic controller.

11. The system of claim 1, wherein:
the operator control unit is one of multiple operator control units arranged in a mesh network; or
the operator control unit is configured to transmit the message to the programmable logic controller via an infrastructure network.

12. The system of claim 1, wherein:
the machine comprises a crane adapted to perform one or more operations in response to the one or more control signals;
the crane does not include a machine control unit before the programmable logic controller; and
the programmable logic controller is connected directly to one or more stepless drives of the crane, such that the programmable logic controller is operable to directly control the one or more operations of the crane.

13. A method of controlling a machine in a system including a programmable logic controller and an operator control unit having a user interface and a wireless interface, the programmable logic controller including a wireless interface, the method comprising:
receiving, via the user interface of the operator control unit, one or more telecommands for allowing an operator to control movement of the machine;
transmitting, by the wireless interface of the operator control unit, a message directly to the wireless interface of the programmable logic controller instead of and without a machine control unit between the operator control unit and the programmable logic controller, the transmitted message based on the one or more telecommands received via the user interface;
receiving, at the wireless interface of the programmable logic controller, the message transmitted by the operator control unit; and
transmitting, by the programmable logic controller, one or more control signals to the machine to control movement of the machine according to the message transmitted by the operator control unit, wherein the system does not include any machine control unit separate from or between the operator control unit and the programmable logic controller;
wherein:
the message transmitted by the operator control unit includes one or more data elements;
the programmable logic controller includes an add-on profile; and
the method further comprises decoding, by the add-on profile, the one or more data elements to interpret the one or more telecommands for directly controlling the movement of the machine by the programmable logic controller.

14. The method of claim 13, wherein the one or more data elements comprise multiple data elements including a source, a target, a cyclic redundancy check, and a timestamp.

15. The method of claim 13, wherein the one or more data elements include one or more of: a source, a target, a cyclic redundancy check, or a timestamp.

16. The method of claim 13, wherein the one or more data elements comprise multiple data elements including at least two or more of: a source, a target, a cyclic redundancy check, or a timestamp.

17. The method of claim 13, wherein the one or more data elements comprise multiple data elements including at least one source and at least one target.

18. The method of claim 13, wherein:
the programmable logic controller is positioned at a stationary location of the machine; and
the operator control unit is portable and remote from the machine and the programmable logic controller.

19. The method of claim 13, wherein:
the wireless interface of the programmable logic controller comprises a WiFi radio interface; or
the message transmitted by the wireless interface of the operator control unit is sent directly to the programmable logic controller via a WiFi radio frequency channel; or
the message transmitted by the wireless interface of the operator control unit is sent to the programmable logic controller via an infrastructure network including at least one of a wireless router, a hard-wired connection, and a backhaul.

20. A programmable logic controller comprising:
a wireless interface configured to receive a message transmitted directly to the wireless interface by a wireless interface of an operator control unit, the message including one or more telecommands received via a user interface of the operator control unit for allowing an operator to control movement of a machine;

a machine interface configured to transmit one or more control signals to a machine to control movement of the machine; and an add-on profile configured to:

decode and interpret the one or more telecommands in the message transmitted by the operator control unit; and transmit one or more control signals to the machine to control movement of the machine according to the one or more telecommands, wherein the programmable logic controller does not receive the message transmitted by the operator control unit via any machine control unit separate from or between the operator control unit and the programmable logic controller;

wherein:

the one or more control signals include one or more data elements; and the add-on profile is configured to decode the one or more data elements to interpret the one or more telecommands whereby the programmable logic controller is then operable to directly control the machine.

21. The controller of claim 20, wherein the one or more data elements comprise multiple data elements including a source, a target, a cyclic redundancy check, and a timestamp.

22. The controller of claim 20, wherein the one or more data elements include one or more of: a source, a target, a cyclic redundancy check, or a timestamp.

23. The controller of claim 20, wherein the one or more data elements comprise multiple data elements including at least two or more of: a source, a target, a cyclic redundancy check, or a timestamp.

24. The controller of claim 20, wherein the one or more data elements comprise multiple data elements including at least one source and at least one target.

25. The controller of claim 20, wherein:

the programmable logic controller is positioned at a stationary location of the machine;

and the operator control unit is portable and remote from the machine and the programmable logic controller; and the wireless interface of the programmable logic controller comprises a WiFi radio interface.

* * * * *